United States Patent [19]
Guzman-Casillas et al.

[11] Patent Number: 5,963,404
[45] Date of Patent: Oct. 5, 1999

[54] RESTRICTED EARTH FAULT PROTECTION FOR TRANSFORMERS USING A DIRECTIONAL ELEMENT

[75] Inventors: Armando Guzman-Casillas; Luther S. Anderson, both of Pullman, Wash.

[73] Assignee: Schweitzer Engineering Laboratories, Inc., Pullman, Wash.

[21] Appl. No.: 09/098,114

[22] Filed: Jun. 16, 1998

[51] Int. Cl.[6] .................................................. H02H 7/00
[52] U.S. Cl. ............................. 361/35; 361/36; 361/42; 361/115
[58] Field of Search ................... 361/35, 42, 45, 361/58, 62, 64, 82, 84, 93, 94, 115, 36

[56] References Cited

U.S. PATENT DOCUMENTS 5,115,226  5/1992  Schweitzer ................................. 361/94
5,572,138  11/1996  Nimmersjo .............................. 361/115

*Primary Examiner*—Stephen W Jackson
*Attorney, Agent, or Firm*—Jensen & Puntigam, P.S.

[57] ABSTRACT

The residual phase currents for each selected winding of a transformer are first determined and then summed to provide a value designated $I_X$. The neutral current for the transformer is also determined, with the neutral current being designated $I_Y$. A directional element calculates a torque value T according to the following formula: $T=R_e(I_X \cdot I_Y^*)$. This torque value will be negative for an external (reverse) fault, and positive for an internal (forward) fault. The quantity of the torque is compared against threshold values before a forward or reverse fault for the transformer is declared.

14 Claims, 7 Drawing Sheets

FIG. 8
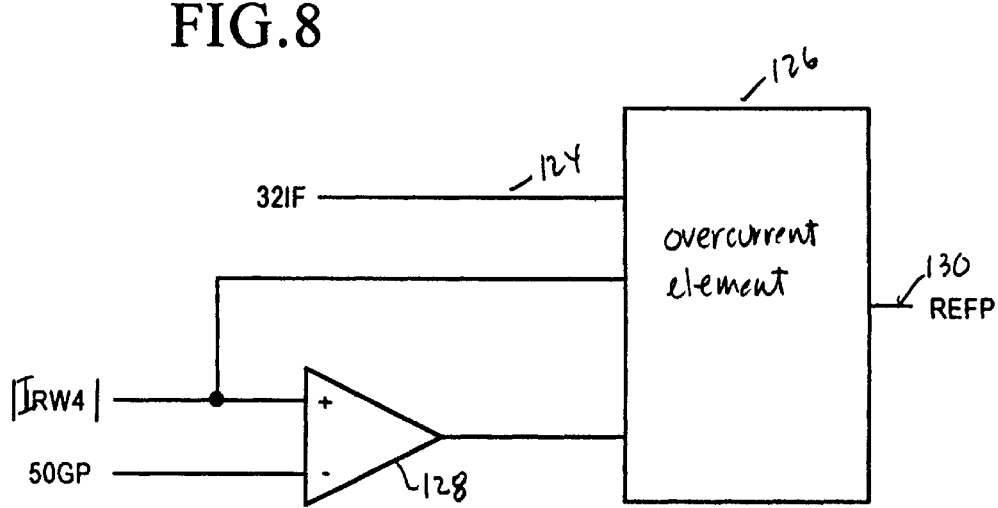
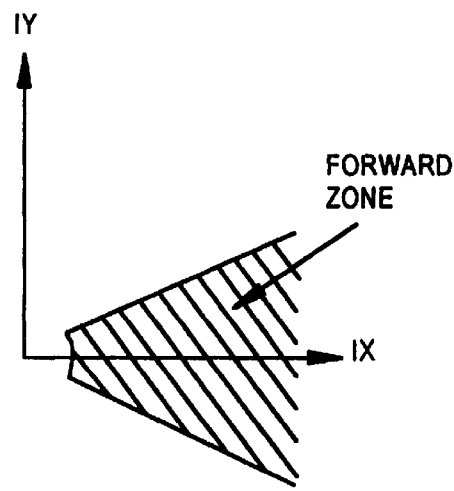
FIG. 9A
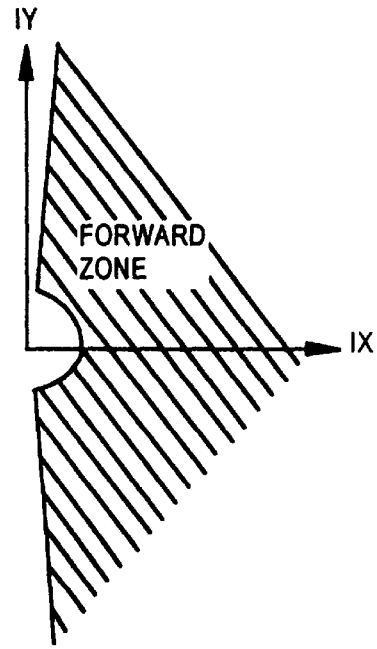
FIG. 9B

RESTRICTED EARTH FAULT PROTECTION FOR TRANSFORMERS USING A DIRECTIONAL ELEMENT

TECHNICAL FIELD

This invention relates generally to protective relays for transformers, including autotransformers, and more particularly concerns such a relay using a directional element which is responsive to residual current values from two autotransformer windings or one transformer winding and the neutral current to detect earth faults in the autotransformer or transformer.

BACKGROUND OF THE INVENTION

Restricted earth fault protection (REF) has been used in the past to protect one winding on a grounded wye transformer. The prior arrangement uses a directional element which measures the phase angle between the neutral current of the transformer and the residual current of the three phases of current in the one winding. The phase angle measurement results in a determination of whether there is a fault inside or outside of a defined protected zone relative to the one winding of the transformer. The past arrangement, however, is quite limited and has some weaknesses in particular operating circumstances.

Those weaknesses and limitations could be addressed in other relay arrangements, which, however, are more expensive than the arrangement of the present invention.

DISCLOSURE OF THE INVENTION

Accordingly, the present invention is a system for restricted earth fault protection for transformers, comprising: means for obtaining residual phase current for selected windings of a transformer; means for summing the residual phase currents for said selected windings; means for obtaining the neutral current of said transformer; means for calculating a torque value using said summed residual currents and said neutral current; and means for evaluating the sign and quality of the torque value to determine whether a fault exists and whether it is forward or reverse.

BRIEF DESCRIPTION OF THE DRAWINGS

FIG. 8 is a block diagram showing a follow-on output circuit for use with the circuit of FIG. 3.

FIGS. 9a and 9b are vectorial plane diagrams showing the directional element characteristics for transformer currents which are close in magnitude to the relay sensitivity and for currents which are above the nominal current.

BEST MODE FOR CARRYING OUT THE INVENTION

The present invention provides REF (restricted earth fault) protection for certain transformers, including autotransformers and wye-connected transformer windings, using a directional element. The directional element is responsive to the sum of the phase currents in selected windings of the transformer, as well as the transformer neutral current. The system can be used to identify both forward (internal) and reverse (external) ground faults relative to an established protective zone.

Figure 1:
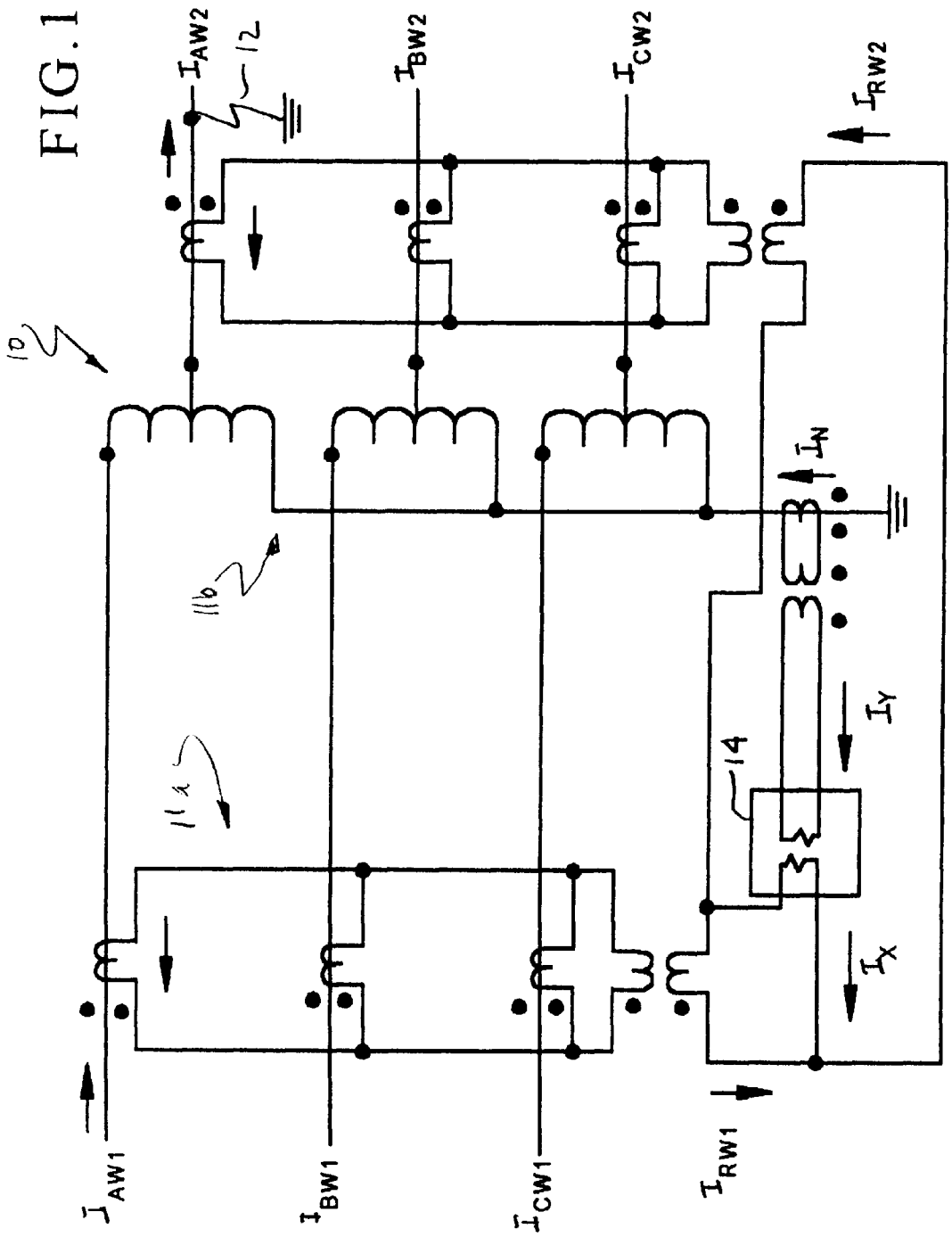
FIG. 1 is a circuit diagram of ground fault protection for an autotransformer, using the system of the present invention.

FIG. 1 shows an autotransformer 10 with a two-winding arrangement 11a, 11b with three phases ($I_{AW}$, $I_{BW}$ and $I_{CW}$) for each winding. The residual current is the sum of the three separate phases of current and is referred to herein as $I_{RW}$. The autotransformer neutral current is referred to herein as $I_N$. An A phase-to-ground fault is shown at 12 in FIG. 1. The sum of the residual currents from two windings shown is designated $I_X$, i.e. the sum of $I_{RW1}$ and $I_{RW2}$. $I_Y$ is designated as the neutral current $I_N$.

A conventional directional element 14 is responsive to the $I_X$ and $I_Y$ currents. The directional element performs a calculation on the current values to obtain a value referred to as torque (T). The torque value is then processed to determine the presence of a forward (internal) fault or a reverse (external) fault. An internal fault indication occurs if the fault is within the "protected zone", i.e. on the protected winding between the line end CTs (current transformers) and the neutral CT.

Figure 2:
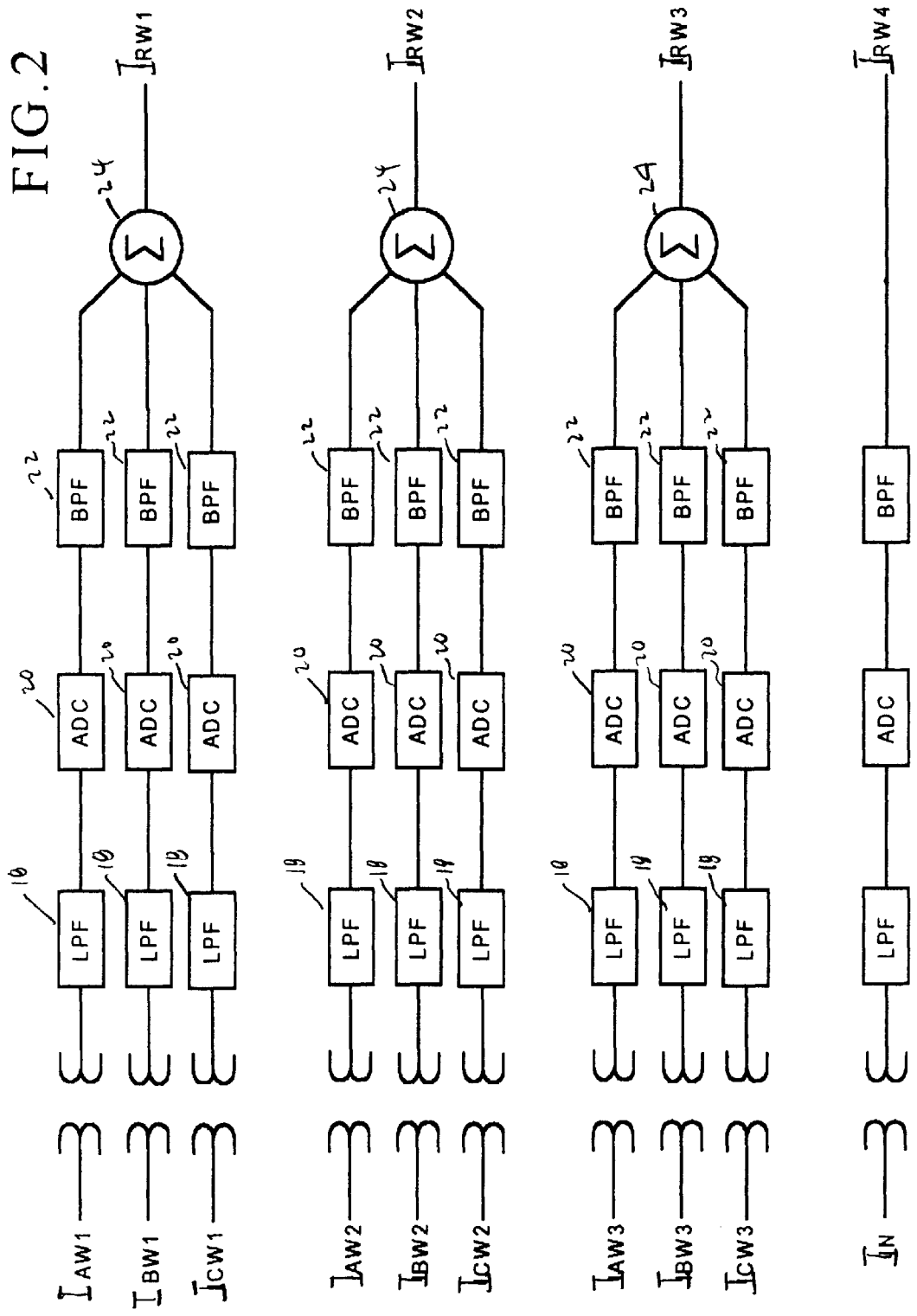
FIG. 2 is a simplified circuit diagram showing the summation of residual currents.

FIG. 2 shows in more detail the determination of $I_{RW1}$ and $I_{RW2}$. It should be understood that although FIGS. 1 and 2 show two and three windings, respectively, the present invention is not limited to a transformer with a specific number of windings. It is also not limited to an autotransformer implementation, such as shown in FIG. 1. FIG. 2 also shows the determination of $I_{RW4}$ current, i.e. the autotransformer neutral current.

The determination of residual current $I_{RW1}$ for winding one is representative of the other windings. Each of the phase currents in the winding, i.e. $I_{AW1}$, $I_{BW1}$ and $I_{CW1}$, are directed from the winding through low pass filters 18—18. From the low pass filters, the currents are applied to analog-to-digital converters 20—20 and from there through bandpass filters 22—22. The outputs of the bandpass filters 22—22 for the currents in the winding are applied to a summing device or adder 24. The output of the summing device is the residual current $I_{RW1}$, as shown. The residual current values $I_{RW2}$ and $I_{RW3}$ for the other windings is produced in the same way. $I_{RW4}$, the transformer neutral current, is applied through a similar low pass filter, A-D converter, band pass filter arrangement. No summing device is, however, required for the neutral current.

Figure 3:
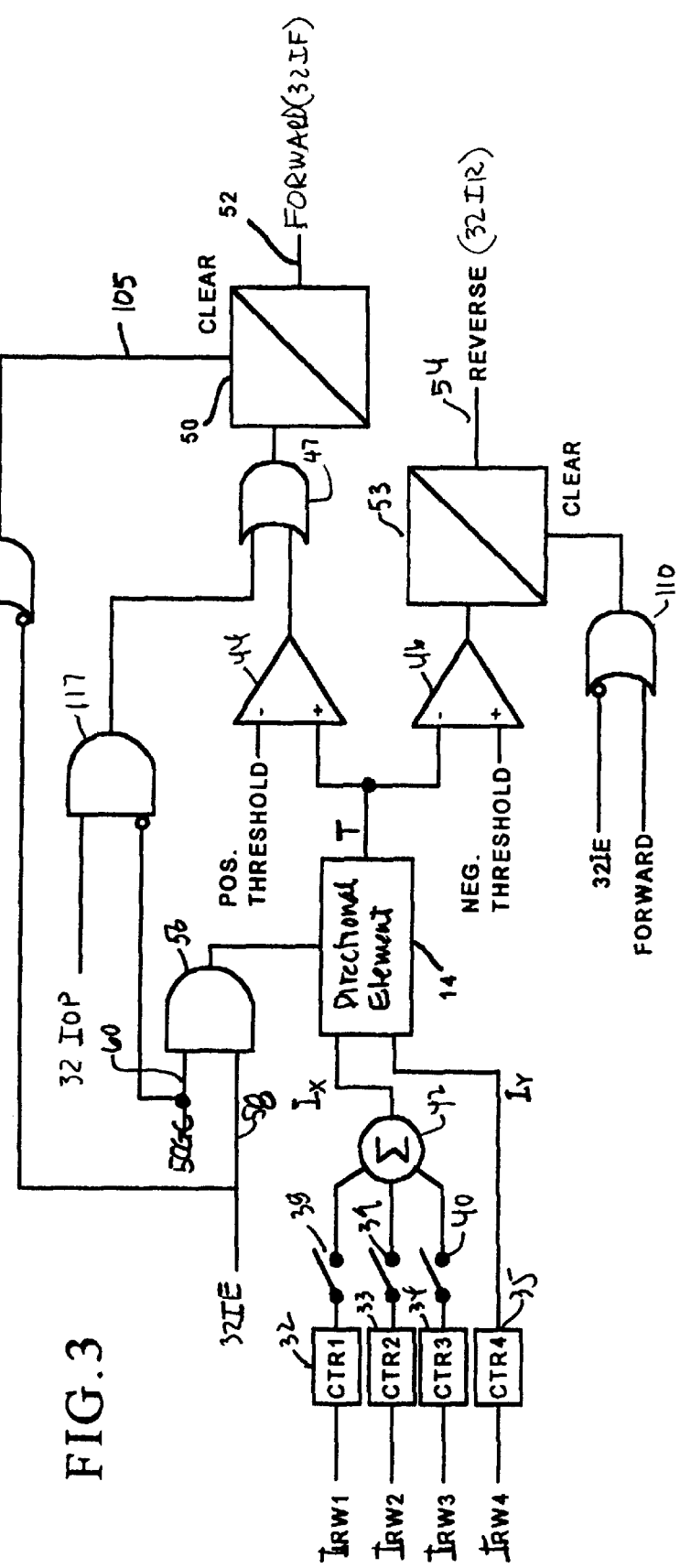
FIG. 3 is a logic diagram showing the system of the present invention.

Referring back to FIG. 1, the particular direction of current flow for $I_{RW1}$, $I_{RW2}$ and $I_N$, shown is the result of an external (reverse) ground fault on phase A, as shown at 12. As FIG. 1 indicates, for such a condition, $I_X$ and $I_Y$ are 180° apart. FIG. 3 shows the circuit of the present invention for declaring an external or internal fault and the direction thereof using the values of $I_X$ and $I_Y$.

The directional element 14 calculates a value referred to as torque (T), according to the following formula:

$$\text{Torque} = R_e(I_X \cdot I_Y^*).$$

For external faults such as represented by FIG. 1, the value T from the directional element 14 will be negative.

Figure 4:
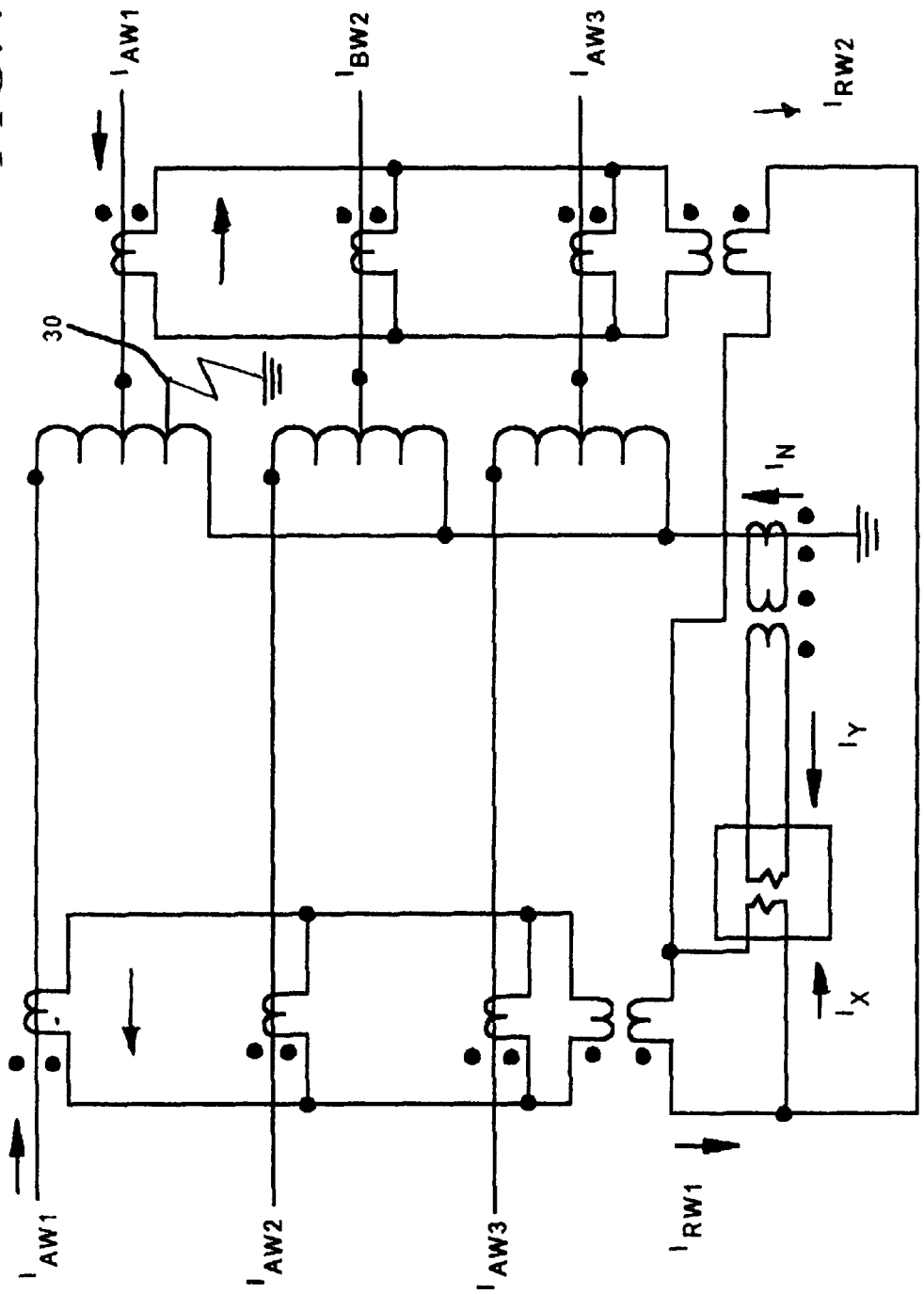
FIG. 4 is a diagram showing transformer current flow for an internal phase-to-ground fault.

The value T will then be processed, as discussed in more detail hereinafter, to the presence of a fault. For an internal fault, such as shown in FIG. 4 (the fault is indicated at 30), the current flow of $I_{RW2}$ will be in the opposite direction from that shown in FIG. 1, resulting in currents $I_X$ and $I_Y$ being in phase. For an internal fault, the value of T will be positive.

FIG. 3 operates as follows. The inputs to directional element 14 are $I_X$ and $I_Y$, with $I_X$ again being the sum of the residual currents of the several transformer windings being protected and $I_Y$ being the transformer neutral current. The $I_X$ value is produced from the values of $I_{RW1}$, $I_{RW2}$ and $I_{RW3}$ for three windings. The neutral current is from the neutral CT, designated $I_{RW4}$ for the purposes of this explanation. The above currents are applied respectively to CT ratio (CTR) gain blocks or elements 32–35. The CTR gain blocks increase the values of each of the input currents back to their "primary" current levels. The residual current values ($I_{RW1}$–$I_{RW4}$) are calculated from current values after they have passed through current transformers (CTs), which substantially reduce the initial primary values. The purpose of the CTR gain blocks 32–35 is to increase the calculated residual current values back to their primary quantities.

The outputs of CTR gain blocks 32, 33 and 34 are then applied, respectively, to switches 38, 39 and 40. The closure of one or more switches 38–40 indicates how many windings will be used for the torque determination. If only one of the switches is closed, e.g. switch 38, then only one winding value ($I_{RW1}$) will be processed. The closure of two switches, e.g. switches 38 and 39 will result in processing of two winding values ($I_{RW1}$ and $I_{RW2}$), while closure of all three switches will result in processing of all three winding values.

The output from switches 38–40 is then applied to an adder 42. The output of adder 42 is the $I_X$ value which is applied at one input to directional element 14. The transformer neutral current, designated $I_{RW4}$, is applied through a CTR gain block 35, the output of which is $I_Y$, which is the other input to directional element 14.

The torque value output of directional element 14 is applied to comparators 44 and 46. The output of the directional element 14 is applied to comparator 44 and compared against a positive threshold value which is present at the other input to comparator 44. If the torque value is above the threshold, then the output of comparator 44 goes high, which is then applied as one input to an OR gate 47, the output of which initiates a timer 50 having a pickup time of 1.5 cycles. The 1.5 cycles provides some security to ensure a true fault condition. The output of timer 50, on line 52, designated 32IF, indicates a forward (internal) fault. A reverse fault indication, when the toque value is negative and is below a second set threshold, as determined by comparator 46, is produced from timer 53 on output line 54, and is designated as a 32IR output signal.

Figure 5:
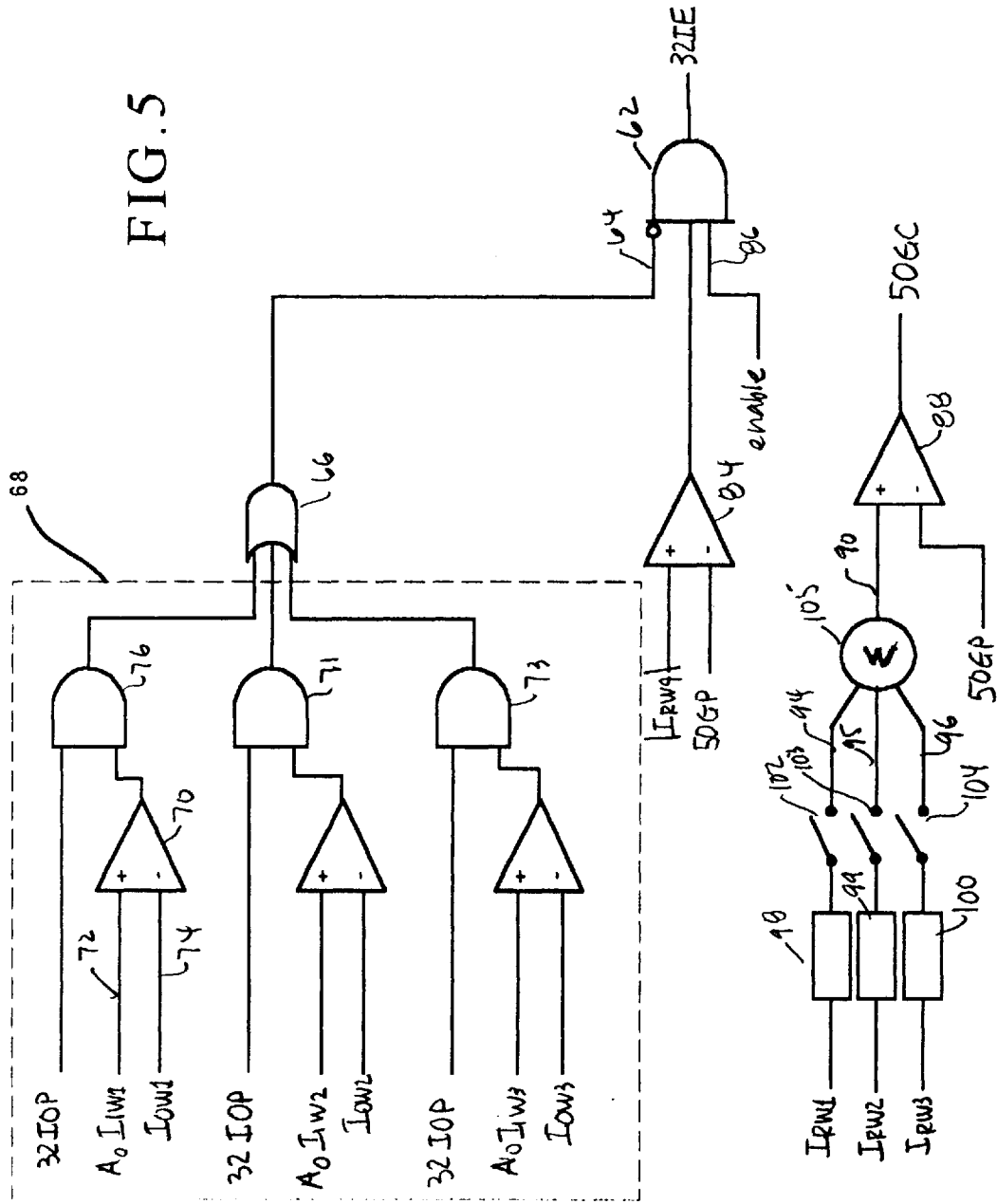
FIG. 5 is a logic diagram showing a circuit for generating some of the inputs to the circuit of FIG. 3.

The directional element is enabled by a high output signal from AND gate 56. If the output of AND gate 56 is low, then the operation of the directional element of FIG. 3 is blocked. The inputs to AND gate 56 are designated 32IE on line 58 and 50GC on line 60. The origin of both these signals is shown in FIG. 5. The 32IE signal is the output of AND gate 62, which in turn has three inputs. The first input to AND gate 62 is an inverted input on line 64, from OR gate 66. The circuit shown within dotted lines 68 determines CT (current transformer) saturation for any of the protected windings. For each of the windings, i.e. for winding 1, a comparator (comparator 70) compares a selected fraction of the positive sequence current, designated $I_1$, for that winding relative to the zero sequence current, designated $I_0$. The fractional positive sequence current $A_0 \cdot I_1$ is present on input line 72, while the zero sequence current is on input line 74. The $A_0$ setting is a positive sequence current restraint factor. A typical $A_0$ value is 0.1.

The output of comparator 70 is applied to an AND gate 76. The other input to AND gate 76 is a bit setting (by the user), the value of which depends upon how many windings are to be used in the protection arrangement comparison. For instance, the bit setting to AND gate 76 will be set to one if winding 1 is used. The bit setting input to AND gate 71 in circuit 68 is set to one if winding 2 is used, while the bit setting input to AND gate 73 is set to one if winding 3 is used. If one or more of the comparisons indicates a CT saturation condition for a winding which is being protected, then the output of OR gate 66 will be a one, which will force the output of AND gate 62 to go low and block the operation of the directional element 14 in FIG. 3.

The second input to AND gate 62 is the output of a comparator 84. The output of comparator 84 is high if the absolute value of the transformer neutral current ($I_{RW4}$) is greater than a selected threshold. The threshold (50GP) is set high enough to guarantee that the current levels are sufficient that a reliable directional decision can be made. Hence, the 50GP setting is a current sensitivity threshold. It can be set as low as 0.05 times nominal current. Two criteria are used in the embodiment shown: (1) the 50GP threshold must be greater than any natural $3I_0$ (zero sequence current) imbalance caused by load conditions and (2) 50GP must be greater than a minimum value determined by the relationship of the CTR values, according to the following formula:

$$50GP \geq 0.05 \bullet I_{nom} \frac{CTRmax}{CTR_4}$$

The third input to AND gate 62 on line 86 is simply a one or zero setting, set to one when the operator desires to actually use the circuit of FIG. 3, i.e. a circuit enable signal. The 32IE signal from AND gate 62 is thus high, i.e. a one, when the output of OR gate 66 is zero, indicating no CT saturation in the windings of interest, when the output of comparator 84 is a one, and the setting on line 86 is a one.

Referring still to FIG. 5, the 50GC bit, which is the output of comparator 88, is a one when the signal on input line 90 is greater than the threshold 50GP signal. The input signal on line 90 is the sum of the residual currents for the selected windings on lines 94, 95 and 96. These signals are all returned to (normalized to) the $I_{RW4}$ current using gain blocks 98, 99 and 100. Switches 102, 103 and 104 again are set according to which windings are actually being protected. The signals from switches 102–104 are then applied to an adder 105, the output of which is applied to comparator 88 for comparison to the 50GP threshold value.

Referring again to FIG. 3, the 32IE bit from FIG. 5 is applied as one input to OR gate 102. This is an inverted input which produces a one output when the 32IE bit is zero. The output of OR gate 102 is applied to a "clear" input 105 of timer 50. Hence, as long as the 32IE bit remains zero, the timer 50 is "clear", with the output of timer 50 being zero.

The other input to OR gate 102, which also will result in a timer "clear" signal, is a signal on line 111 that a reverse fault has actually been declared by the circuit.

As indicated above, for internal faults, directional element 14 produces a positive torque output, and if the value is above the threshold, as determined by comparator 44, an indication of a forward fault is provided on line 52. Conversely, for an external fault, a negative value of torque will result for the directional element, which is applied to comparator 46. If the negative value is lower than the negative threshold, as determined by comparator 46 then the timer 53 is initiated after 1.5 cycles to produce a reverse direction signal on line 54. Timer 53 is cleared by a signal from OR gate 110, similar to the action of OR gate 102. If a forward fault has been declared or a 32IE bit is not present, then the timer is maintained in a "clear" condition.

The above circuitry has a number of specific advantages in particular situations. One is an increased sensitivity for unbalanced load currents. With the particular arrangement involving $I_X$ and $I_Y$ and the application thereof to the directional element, winding one (residual current) due to load imbalance cancels winding two residual load current. At the output of the adder, the only zero sequence current left is the zero sequence current due to the fault. Hence, the load imbalance current in the arrangement shown does not jeopardize the sensitivity of the directional element.

Figure 6:
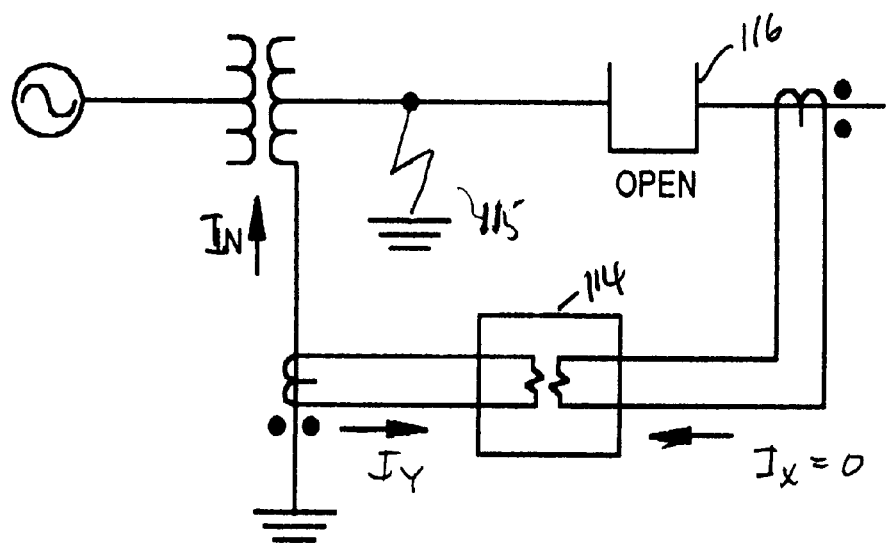
FIG. 6 is a diagram showing a ground fault in the wye side of a delta-wye connected transformer.

FIG. 6 shows a delta-wye transformer application. In this application, the winding setting will be one. Only $I_Y$ ($I_{RW4}$) will be considered. If a ground fault 115 occurs within the protected zone (internal fault) on the wye side of the transformer and the breaker 116 on the wye side is open, Is current will flow as shown into the directional element 114, but there will be no $I_X$ current because of the open breaker 116. In this case, the 50GC bit from FIG. 5 is zero because the $I_{RW1}$ value will be less than the 50GP threshold. The 32IE bit, however, will be one, because the neutral current $I_{RW4}$ will be greater than the 50GP threshold value. Thus, the directional element will be disabled. The output signal of AND gate 117 will be one when the 50GC signal turns to zero and the output of timer 50 will be one, when the output of AND gate 117 is one for at least 1.5 cycles. The output of timer 50 indicates a forward (internal) ground fault.

Figure 7:
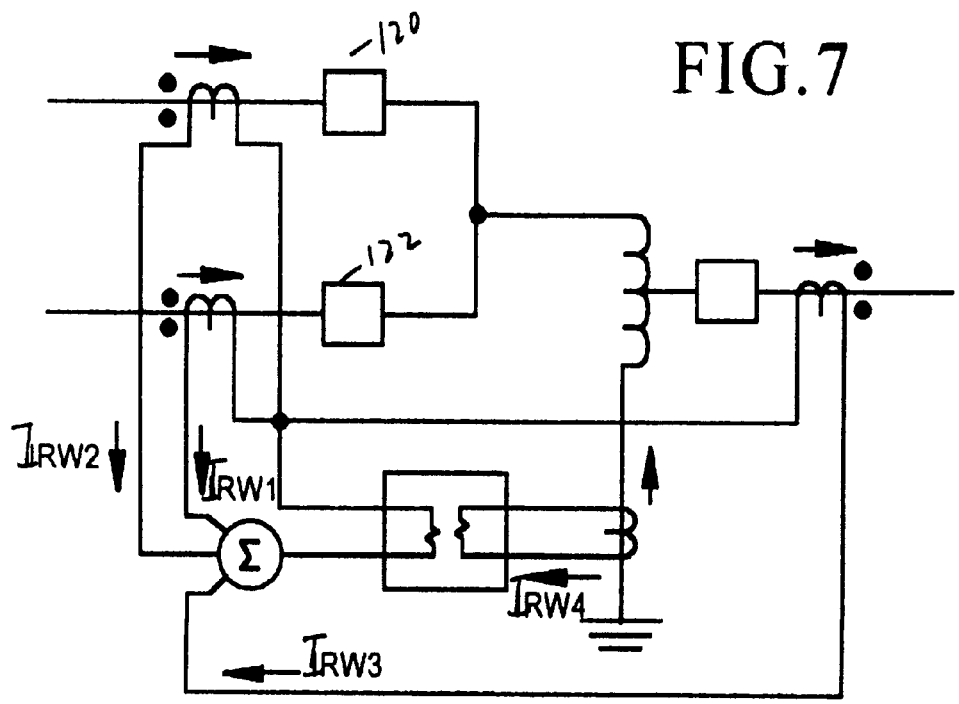
FIG. 7 is a diagram showing the flow of currents for an autotransformer with a double breaker on the high side of the autotransformer.
Figure 1:
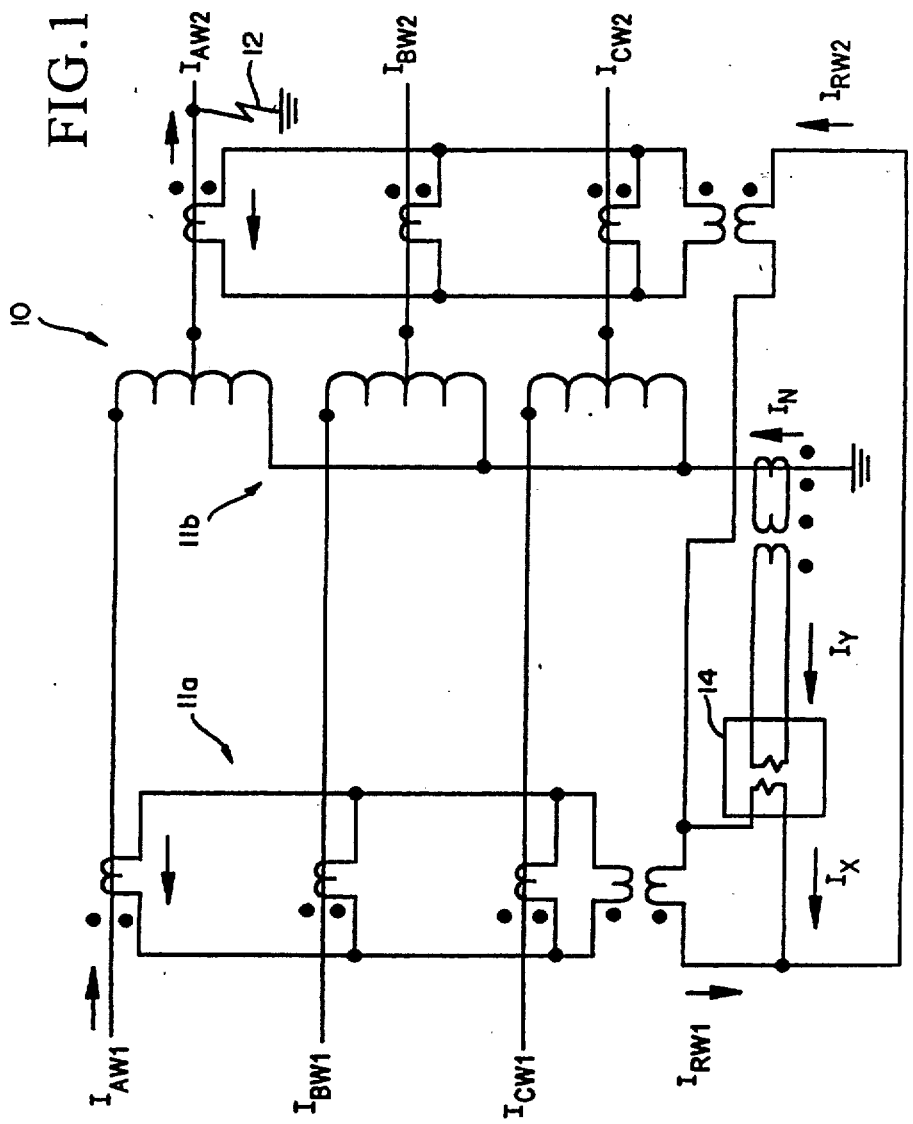
Figure 3:
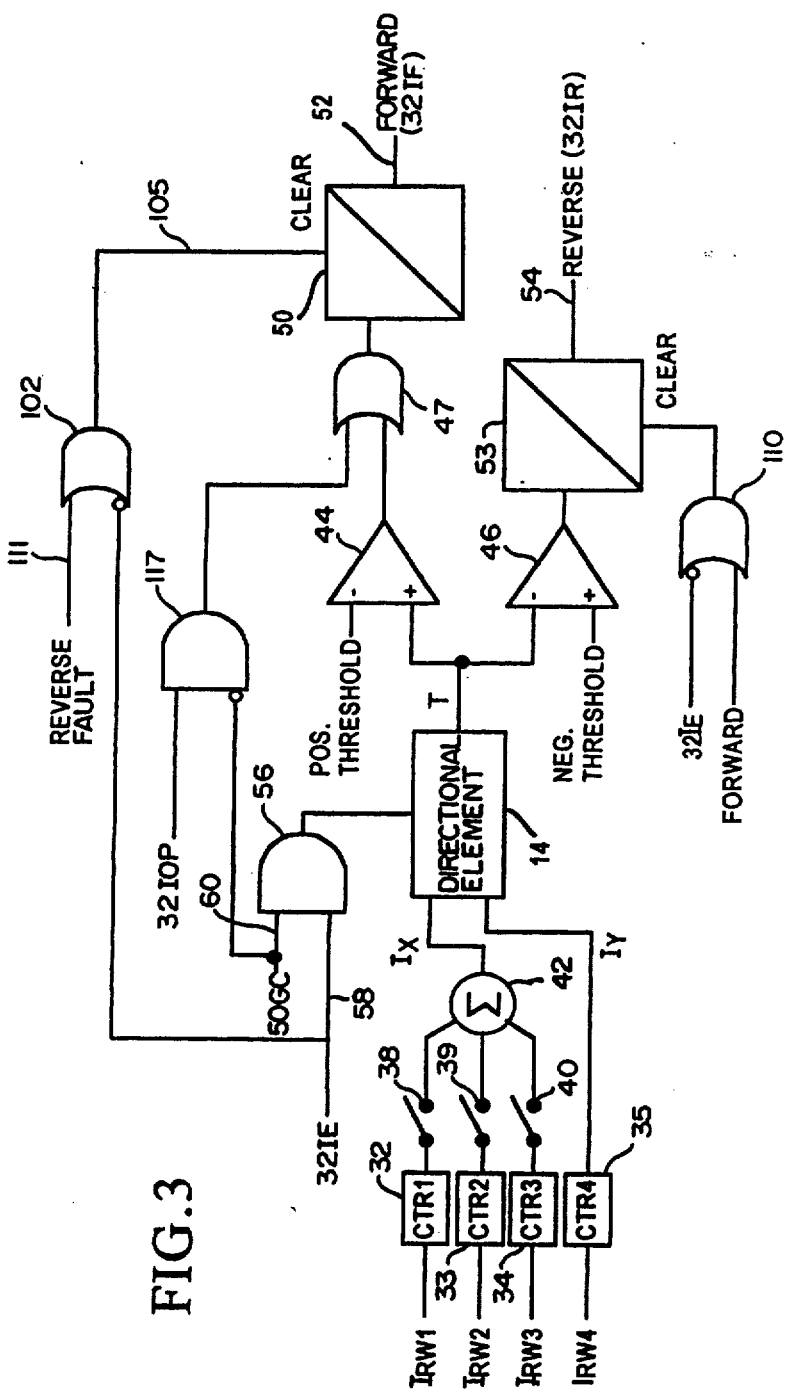
Figure 4:
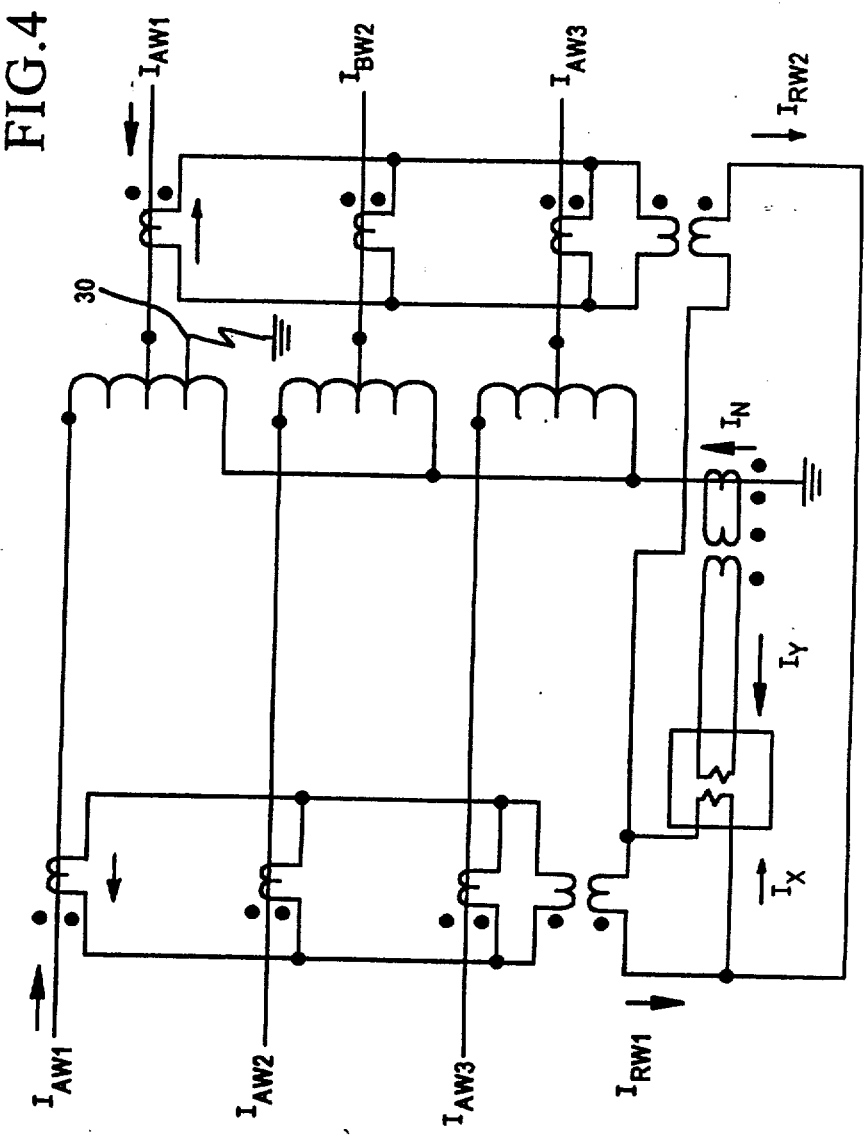
Figure 5:
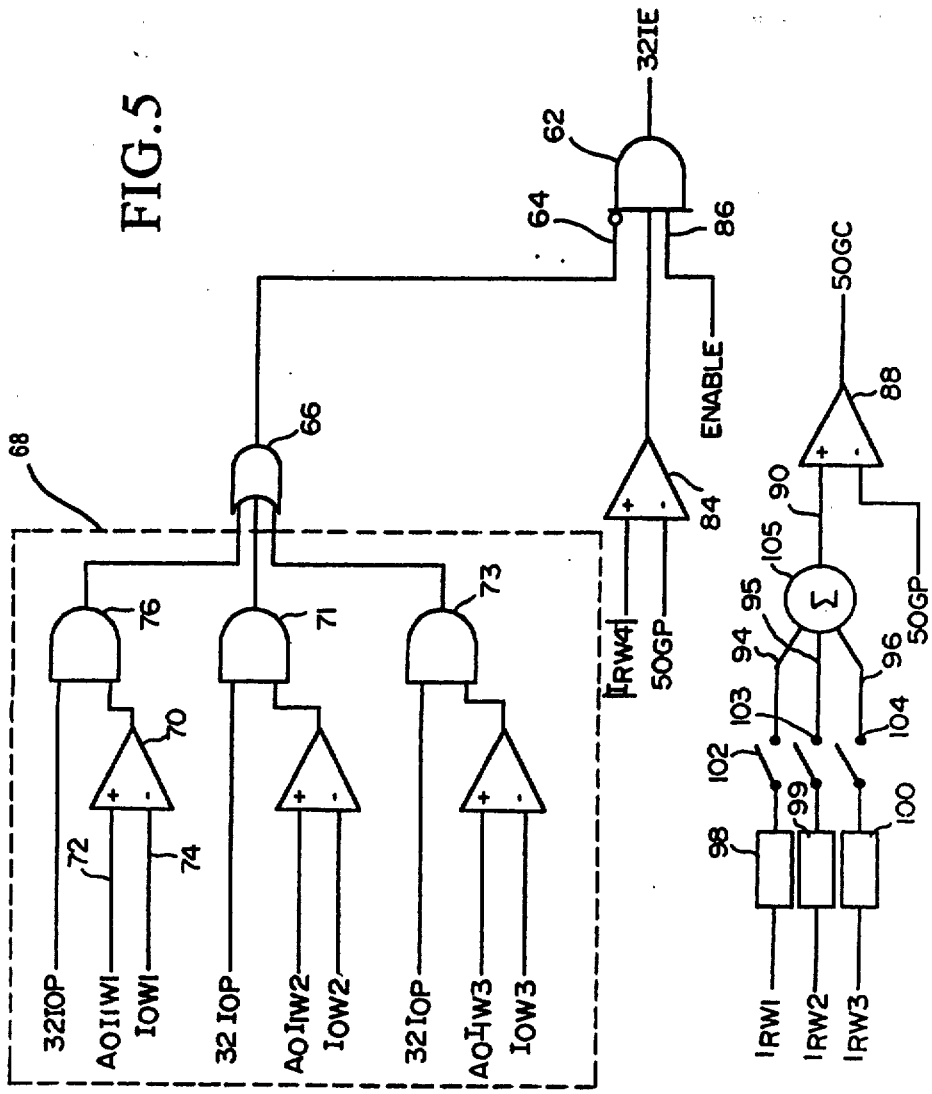
Figure 6:
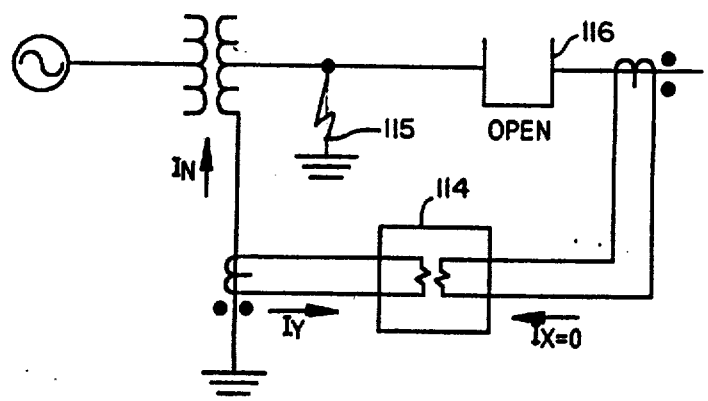
Figure 7:
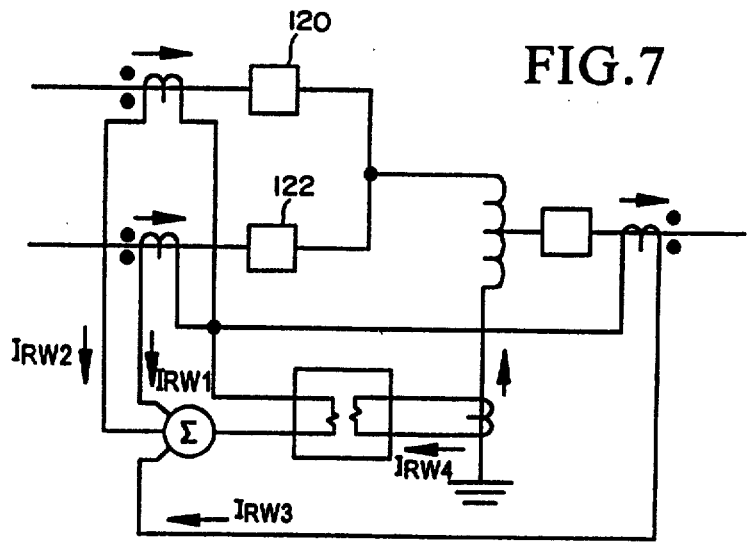

Another application is with an autotransformer which may be a part of a ring bus or a breaker and a half substation bus arrangement, as shown in FIG. 7. The circuit has two high side circuit breakers, 120 and 122. When the winding setting indicates all three windings $I_{RW1}$, $I_{RW2}$ and $I_{RW3}$ are being measured, the circuit will compare the sum of those residual currents to the 50GP threshold. The 50GC output bit will be one if the sum is greater than the threshold.

FIG. 8 shows additional output circuitry which can be used with the forward output bit from timer 50 in FIG. 3. The forward bit 32IF is applied to an "enable" input 124 of overcurrent element 126. The overcurrent characteristic is an extremely inverse time overcurrent curve, with a one cycle reset. The other input to overcurrent element 126 is the output of a comparator 128, which compares the transformer neutral value ($I_{RW4}$) against the 50GP threshold setting value. The output of overcurrent element is on line 130 (REFP).

Another feature of the present invention involves the thresholds used in comparators 44 and 46 in FIG. 3. The purpose of the positive and negative thresholds for comparators 44 and 46 is to provide security relative to small current values. Typically, the signal-to-noise ratio for small currents will be smaller than for large current values. Instead of a fixed threshold, an adaptive threshold could produce a directional characteristic in which the operating or internal fault region depends upon the magnitude of the input quantities. FIGS. 9A and 9B show such an arrangement. In FIG. 9A, the operating region, i.e. the forward zone covered by the relay, will be restricted for input currents which are close to the value of relay sensitivity, while in FIG. 9B, the forward zone is relatively unrestricted for input currents which are above a specific, nominal level. This adaptive threshold will change in accordance with the following formula:

$$\text{threshold value} = m \cdot |I_X| \cdot |I_Y| + b$$

where m and b are selected constants.

In summary, the above relay has a relatively high sensitivity, due to a sensitive 50GP element. Further, load imbalance currents, as discussed above, do not affect the sensitivity of the directional element, and delta-wye transformer applications can be handled by the existing logic when the wye side breaker is open. Security of the apparatus is also quite favorable, due to the sensitivity threshold established by the 50GP element, the CT saturation detection feature, and the adaptive thresholds. The circuit also provides good REF protection for autotransformers in ring bus or breaker and a half substation bus arrangements.

Although a preferred embodiment of the invention has been disclosed herein for illustration, it should be understood that various changes, modifications and substitutions may be incorporated in such embodiment without departing from the spirit of the invention, which is defined by the claims as follows:

What is claimed is:

1. A system for restricted earth fault protection for transformers, comprising:

means for obtaining residual phase currents for selected windings of a transformer;

means for summing the residual phase currents for said selected windings;

means for obtaining the neutral current of said transformer;

means for calculating a directional value using said summed residual currents and said neutral current; and means for evaluating the sign and quantity of the directional value to determine whether a fault exists and whether it is forward or reverse.

2. A system of claim 1, wherein the directional value is determined by the following formula:

$$T = R_e(I_X \cdot I_Y^*)$$

where $I_Y$ is equal to said neutral current and $I_X$ is equal to said sum of the residual currents.

3. A system of claim 1 wherein the transformer is an autotransformer.

4. A system of claim 1, wherein the transformer is a delta-wye connected transformer, and the wye side breaker of the transformer is open.

5. A system of claim 1, where the residual currents are primary level values.

6. A system of claim 1, including means for disabling the operation of the calculating means when the residual current from any one of the selected windings is lower than a selected threshold value.

7. A system of claim 1, wherein a positive value of torque indicates a forward fault and a negative value of torque indicates a reverse fault.

8. A system of claim 1, wherein the calculating means includes a directional element.

9. A system of claim 1, including an output circuit responsive to an indication of a forward fault, the output circuit comprising an overcurrent element having an extremely inverse time overcurrent characteristic.

10. A system of claim 1, including means for disabling the operation of the calculating means when one of the selected windings has a current transformer associated therewith which is saturated.

11. A system of claim 10, including means for disabling the operation of the calculating means when said neutral current fails to exceed a selected threshold level.

12. A system of claim 1, including means for comparing the value of the torque against selected threshold values and wherein a forward or reverse fault is declared only when the torque exceeds said threshold values, respectively, for a selected period of time.

13. A system of claim 12, wherein the selected period of time is 1.5 cycles.

14. A system of claim 12, wherein the threshold values change in a predetermined adaptive manner in accordance with the magnitudes of the residual currents and neutral current applied to the calculating means.

\* \* \* \* \*

UNITED STATES PATENT AND TRADEMARK OFFICE
CERTIFICATE OF CORRECTION

PATENT NO.    : 5963404

DATED         : October 5, 1999

INVENTOR(S)   : Guzman-Casillas et al.

It is certified that error appears in the above-identified patent and that said Letters Patent is hereby corrected as shown below:

The Title page should be deleted and substitute therefore the attached Title page.

Delete drawing sheets 1-7, and substitute therefor the drawing sheets consisting of Figs. 1-9B, as shown on the attached pages.

Signed and Sealed this

Twenty-second Day of August, 2000

*Attest:*

Q. TODD DICKINSON

*Attesting Officer*    Director of Patents and Trademarks

United States Patent
Guzman-Casillas et al.

[11] Patent Number: 5,963,404
[45] Date of Patent: Oct. 5, 1999

[54] RESTRICTED EARTH FAULT PROTECTION FOR TRANSFORMERS USING A DIRECTIONAL ELEMENT

[75] Inventors: Armando Guzman-Casillas; Luther S. Anderson, both of Pullman, Wash.

[73] Assignee: Schweitzer Engineering Laboratories, Inc., Pullman, Wash.

[21] Appl. No.: 09/098,114

[22] Filed: Jun. 16, 1998

[51] Int. Cl.$^6$ ............................................. H02H 7/00
[52] U.S. Cl. ............................ 361/35; 361/36; 361/42; 361/115
[58] Field of Search ............................ 361/35, 42, 45, 361/58, 62, 64, 82, 84, 93, 94, 115, 36

[56] References Cited

U.S. PATENT DOCUMENTS 5,115,226  5/1992  Schweitzer ........................... 361/94
5,572,138  11/1996  Nimmersjo ........................... 361/115

*Primary Examiner*—Stephen W Jackson
*Attorney, Agent, or Firm*—Jensen & Puntigam, P.S.

[57] ABSTRACT

The residual phase currents for each selected winding of a transformer are first determined and then summed to provide a value designated $I_X$. The neutral current for the transformer is also determined, with the neutral current being designated $I_Y$. A directional element calculates a torque value T according to the following formula: $T=R_e(I_X I_Y^*)$. This torque value will be negative for an external (reverse) fault, and positive for an internal (forward) fault. The quantity of the torque is compared against threshold values before a forward or reverse fault for the transformer is declared.

14 Claims, 7 Drawing Sheets

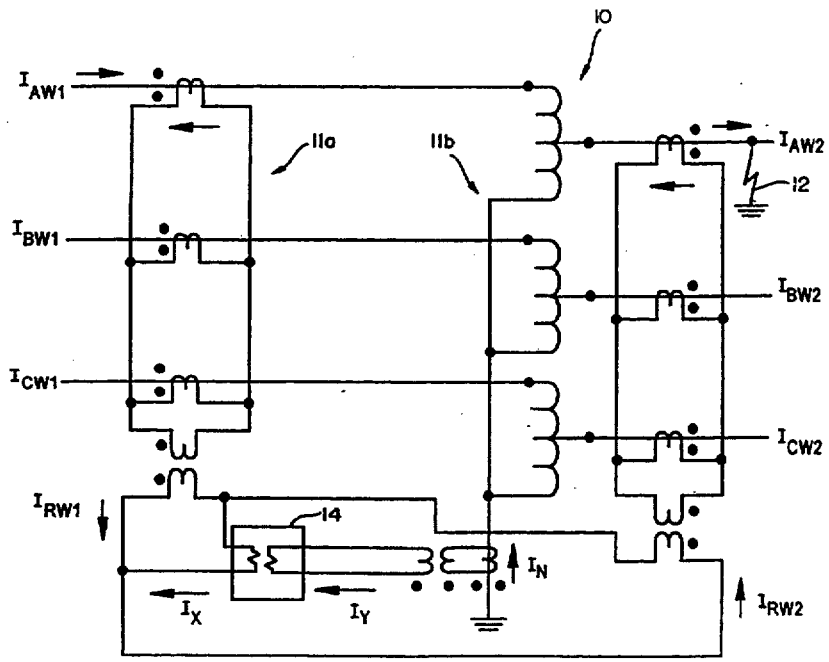

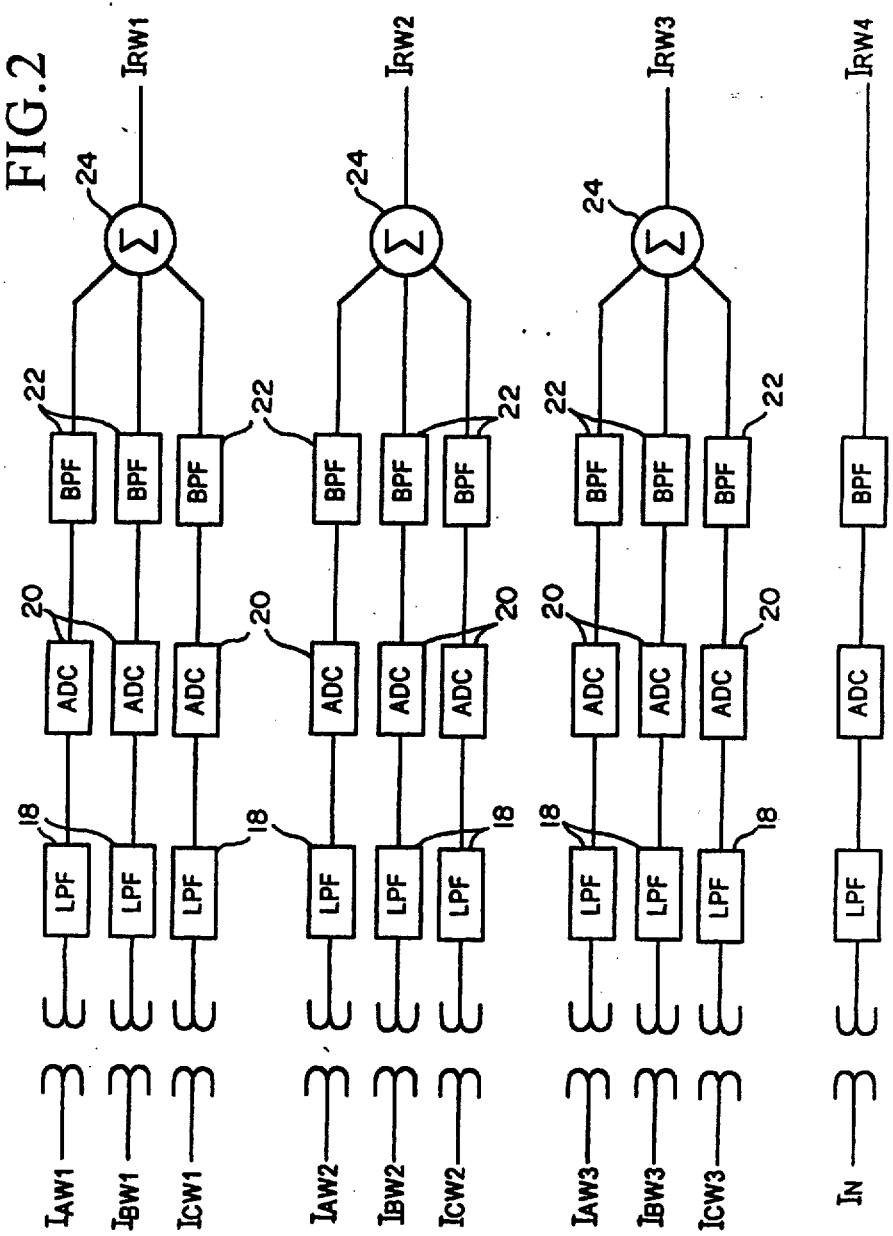

FIG.8
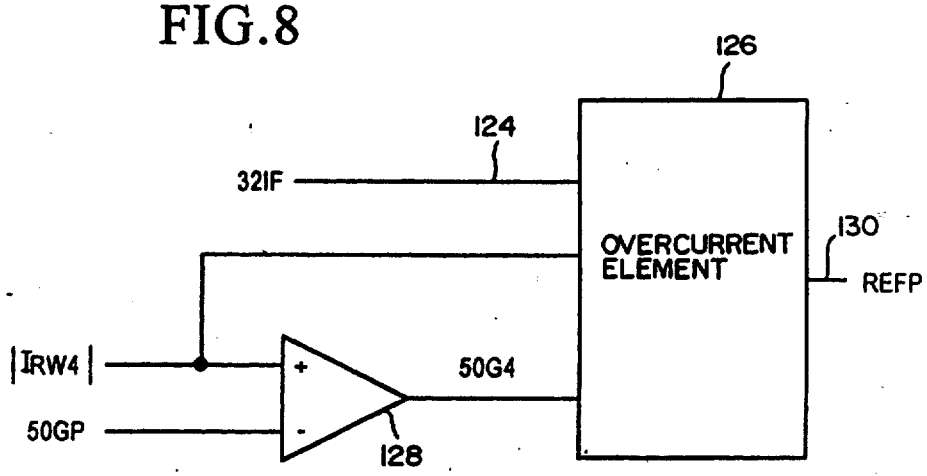
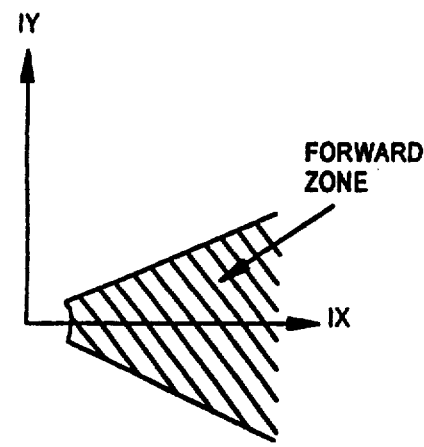
FIG.9A
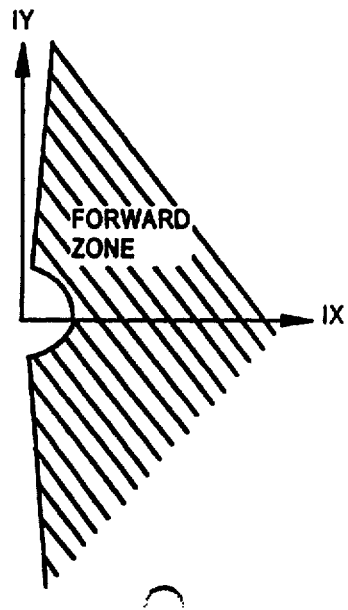
FIG.9B